Jan. 3, 1961  E. EISNER  2,967,292
DATA PROCESSING METHOD AND APPARATUS
Filed Sept. 6, 1955  2 Sheets-Sheet 1
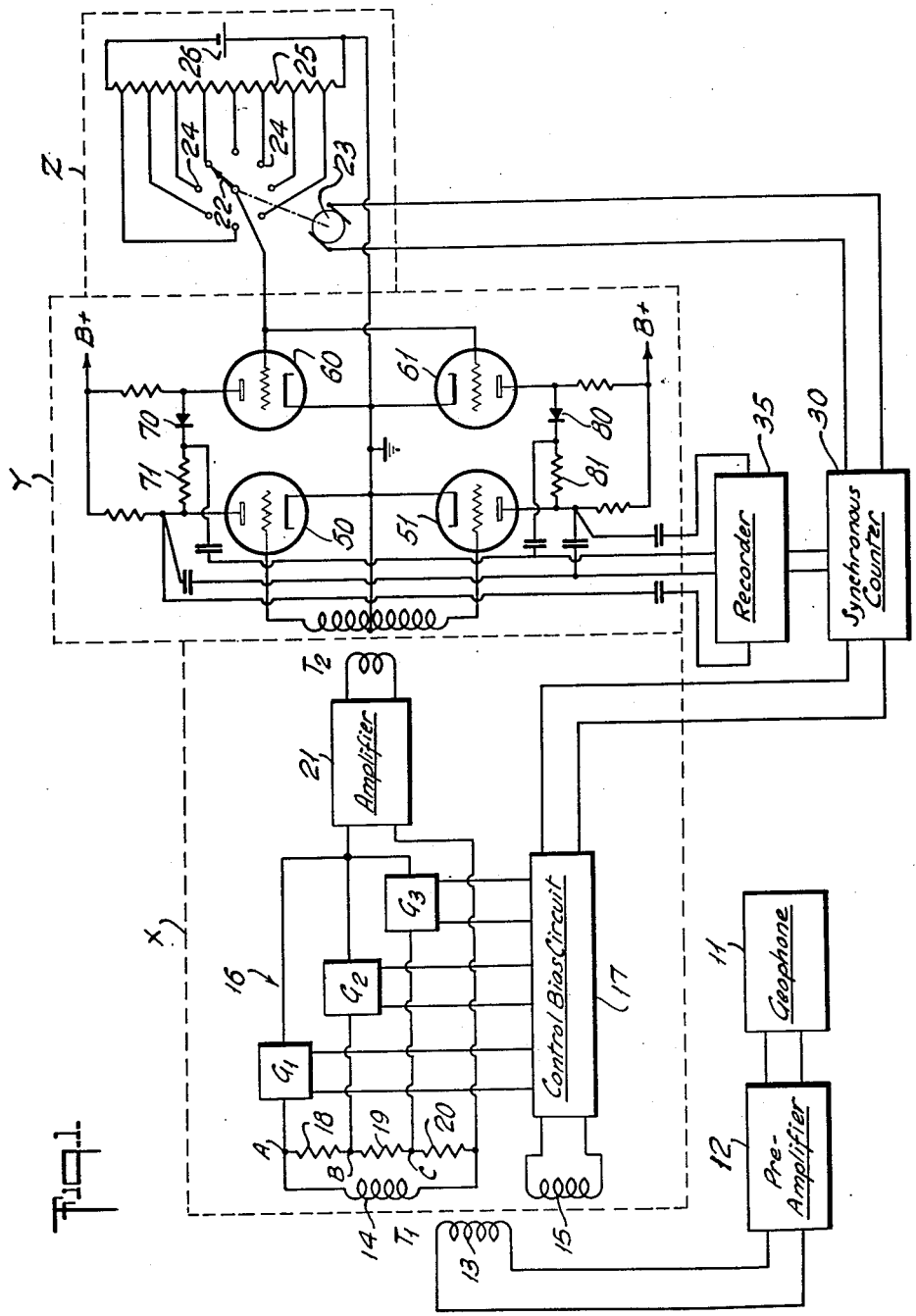

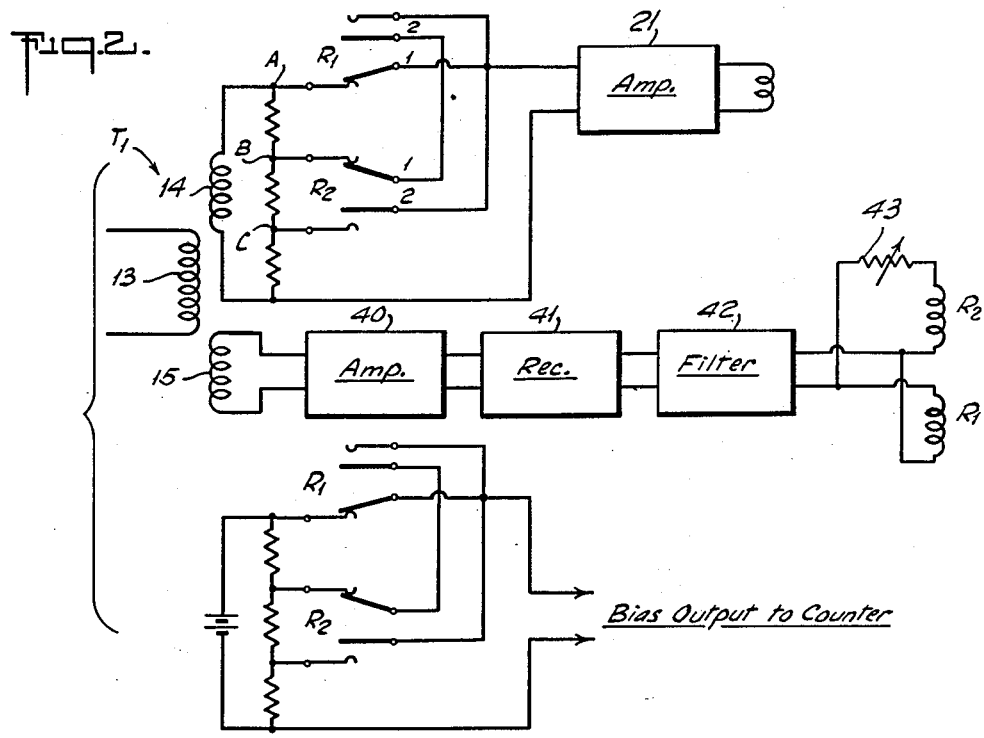
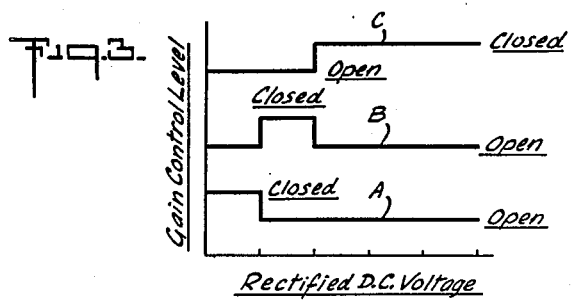

United States Patent Office 2,967,292
Patented Jan. 3, 1961

2,967,292

DATA PROCESSING METHOD AND APPARATUS

Elmer Eisner, Houston, Tex., assignor to Texaco Inc., a corporation of Delaware

Filed Sept. 6, 1955, Ser. No. 532,715

4 Claims. (Cl. 340—15)

The present invention relates generally to seismic recording systems and, more particularly, the invention is concerned with controlling the gain characteristic of data processing systems employed in seismic prospecting. The invention is further concerned with digitalizing a continuous signal produced by such a system and recording the digitalized value thus produced.

In accordance with well-known procedures, it is conventional in the course of seismic exploration to employ one or more geophones to detect the energy transmitted through the earth from an explosion produced a certain distance from the geophone at a location known as the shotpoint. The energy level of the various components arriving at the detector may vary due to the size of the explosive charge, the transmission characteristics of the earth as well as the different distances traversed by the various waves. In order to process the seismic data detected by the geophone it is frequently desirable to reduce the trace excursions of the relatively higher energy received waves as compared with that of the relatively lower energy received waves, in order to facilitate their observation on a display device or recording apparatus within approximately the same general amplitude range.

Inasmuch as it is desirable to know the relative amplitudes of the received waves as observed on a display device or on a recorder, conventional automatic-volume-control apparatus has not been found completely satisfactory for confining the signal level within a given range. Moreover, since analysis of seismic records often requires determination of the integral of the rectified geophone signal, the use of conventional automatic-volume-control circuitry introduces a factor requiring non-linear calibration, thus complicating the problem of analyzing the record.

Accordingly, it is one object of the present invention to provide improved means for controlling within a predetermined range the level of a signal being processed by a translating apparatus, which means further includes an indication of the level of operation of the translating device at any instant. This indication may actually comprise an automatic compensation.

A more specific object of the invention is to provide a gated-level control apparatus for a seismic recording system, wherein the recording means preserve the absolute instantaneous signal value.

In recording seismic traces it is often desirable to convert a signal whose amplitude varies continually with time to a series of pulse components of discrete time duration, representing the amplitude of the continuously varying wave during certain predetermined time intervals. Such pulse components, or digitalized signals, are useful for various purposes, for example they may be counted to provide a digitalized representation of the signal.

It is a further object of the present invention to provide an improved seismic system including improved means for digitalizing an analog signal.

It is a still further object to provide an improved digital counter apparatus featuring a continuously operating counter reference source and means for observing the value presented by the counter at a predetermined instant of time when the amplitude of the incoming signal bears a determinable relation to the value represented by the counter.

It is still another object of the invention to provide an improved apparatus of the type described for converting an analog signal to a digital value and for recording the digital value in a manner suitable for subsequent use in digital computing apparatus.

Briefly stated, one aspect of the present invention contemplates provision of a seismic level recording system including means for establishing a predetermined signal translation level within a selected one of a plurality of ranges and wherein means are further provided for digitalizing a continuously varying signal translated by the system and for recording the digitalized value. The digitalized value is presented to a counting device which automatically accounts for the transfer level established by the aforementioned automatic level control circuit.

In accordance with one embodiment of the invention, the switching function of the automatic level control circuit and of the counting portion of the system are controlled by a common source of switch-level bias, thereby to assure simple and accurate synchronism between the switch level and counting portions of the system.

A further feature of the invention comprises the provision of a source of reference potential whose amplitude varies with time and means for comparing the reference potential to the incoming signal. Preferably, there is also provided means for actuating a recorder when the value of the varying reference potential coincides with a predetermined function of the amplitude of the incoming signal wave.

The objects and advantages of this invention may be better understood and appreciated by referring to the detailed description set forth below, together with the drawings, in which:

Figure 1 is a schematic circuit diagram, partly in block form, showing a seismic level recording system employing features of the present invention:

Figure 2 is a schematic circuit diagram, partly in block form, setting forth in greater detail a portion of the system shown in Figure 1 corresponding to that represented by the block enclosed by the dashed box X;

Figure 3 is a graphic display of the switching characteristics of the circuit shown in Figure 2; and, Fig. 4 is a diagram showing in words the state of the contacts numbered 1 and 2 of relays $R_1$ and $R_2$ and indicating the path that is completed for each of the 3 signal levels.

Referring now to Figure 1, there is shown a seismic recording system including a geophone 11, which may be a conventional transducing apparatus capable of detecting the acoustic waves comprising a seismic signal at the surface of the earth and converting them into electrical energy. A conventional preamplifier device 12 is coupled in known manner to the output of the geophone 11 in order to amplify the relatively weak electric signals produced thereby. The output of the preamplifier 12 is coupled, as by means of the transformer $T_1$ having an input or primary winding 13 and first and second output or secondary windings 14 and 15, to an automatic switch-level control circuit 16 and a control-bias circuit 17, respectively.

The automatic level control circuit 16 comprises a voltage divider for attenuating the signals by predetermined constant percentage amounts. It is connected across the output of the secondary winding 14, as shown, and includes resistance elements 18, 19, 20 connected in series circuit relation. A plurality of gating circuits $G_1$, $G_2$ and $G_3$, respectively, are provided for selecting a desired one of the various taps A, B or C on the voltage divider. The outputs of the respective gating circuits $G_1$, $G_2$ and $G_3$, are connected together to provide a common output path with respect to the lowermost portion of the voltage divider.

In the present embodiment, the gating function of the level control circuit is determined by the signal level at any given time by means of the control bias circuit 17 which provides a rectified sample of the signal for switch-control purposes, as described in greater detail at a later point in the application.

The output of the switch-level control circuit 16 is coupled to an amplifier 21, shown in block form, which, in turn, is coupled as by means of a transformer $T_2$ to a comparison circuit enclosed by the dashed box Y, whose function, as will be described in greater detail below, is to compare the amplitude of the seismic signal appearing at the output of the amplifier 21 with a source of known reference potential whose amplitude varies with time. The reference source is indicated by the dashed box Z in the drawing.

The source of known reference potential may comprise a mechanically actuated sweep or rotor contact 22 pivoted about an axis and mechanically coupled to an electric motor 23, or the like, for rotation at a predetermined rate. A plurality of stator contacts 24 are distributed in an arc about the axis of rotation and arranged to be contacted successively by the rotor contact 22 as it rotates about its axis. The individual stator contacts 24 are connected to successive points along a voltage divider 25 which, in turn, is connected to a suitable source of direct current potential, such as a battery 26 or other equivalent source. Other sources of time-varying reference potential may be employed and such are discussed in greater detail below.

In certain instances it has been found desirable to convert seismic signals to digital values on a non-linear scale, for example, a logarithmic scale. This may be accomplished by employing a voltage source having the desired characteristic by connecting the successive stator contacts 24 to points of potential in the desired non-linear sequence on the voltage divider 25. Thus, in accordance with the definition of a logarithmic scale, the desired incremental resistance between successive contacts should be a fixed percentage of the preceding total resistance.

Non-linear sampling may also be obtained by connecting the stator contacts to a linear reference source and providing unequal spacing between the various stator contacts 24. In similar manner, sampling definition may be controlled, i.e., increased or decreased for higher or lower energy signal waves, depending upon whether the stator contact density of the time-varying reference source is greater at the higher or lower end of its potential range. Such an arrangement permits the sampling definition pattern to be selected in accordance with the portion or portions of the signal amplitude range of greatest interest.

Another form of reference source may comprise a resistance element that is continuously variable throughout its range, such as a wire-wound or other resistance having a wiper contact arranged to traverse the element from one end to the other while maintained in continuing contact therewith.

The time-varying characteristic of the known reference potential is coupled to a synchronous counter 30 which provides means for representing an instantaneous digital value as a function of the reference potential. In the illustrated embodiment, the synchronous counter is coupled to the reference source by means of an electric connection between the counter and the motor 23 that drives the reference switch rotor 22.

In accordance with another embodiment, a mechanical coupling is employed to synchronize the reference source with the digital representation afforded by the counter. One form of mechanical coupling comprises a common shaft or rotating element from which both a mechanically driven source of time-varying references potential, such as that described above, and a mechanical digital representation or display are driven. In either event, such mechanical commutators may conceivably rotate at 1000 cycles per second. On the order of 100 switches per revolution may be readily attained. Such apparatus is adequate for counting up to 500 cycles per second in 100 discrete amplitude steps. For higher speeds, however, an electrical commutator may comprise a comparatively short persistence cathode-ray tube observed by a photomultiplier tube which is capable of switching times of one microsecond or less. As pointed out above, the discrete amplitude steps, whatever their number may be, need not be equally spaced. However, for present purposes it is preferred to use equal spacing on a logarithmic scale in applications where it is desired to provide other than a linear potential reference range. It is noted that all readings then have the same percentage rather than absolute accuracy. However, inasmuch as it is not necessary in seismic work to add signals of widely different amplitudes, corresponding to the front and terminals ends of seismic records, this is not a significant limitation. In the interest of stability control, it is preferable to make an auxiliary determination of the signal sign and make the comparison voltage the same sign, thereby to take advantage of the stability of zero volts. The signal polarity can be recorded separately.

The synchronous counter 30 affords means for correlating the instantaneous value of the reference source with the incoming signal wave. Preferably, the counter 30 comprises a source of recurrent pulses suitable for representing a desired digital value. The source of pulses may include an oscillator and appropriate wave-shaping circuit. The source of pulses is synchronized with the reference source such that the counter produces a digital representation which may be in the form of a number of pulses indicative of the instantaneous position of the reference rotor 22 and corresponding to the digital value of the signal wave. Thus, the counter provides means for presenting a digital representation of the position of the reference rotor switch from a predetermined starting position, normally at zero, as it sweeps through its range until coincidence is achieved with an incoming signal wave, as determined by the operation of the comparison circuit, as discussed below. A recorder 35 is coupled to the comparison circuit for actuation thereby and records the value presented by the counter 30 at coincidence of the signal and reference values.

Means are further provided for establishing the counter range in accordance with the gain characteristics of the system as determined by the automatic level control circuit 16 at any given instant. In the present embodiment, this is accomplished by coupling the output of the control bias circuit 17 to the synchronous counter 30. Thus, both the gating function of the level control circuit 17 and the range setting function of the counter 30 are established as functions of a common event.

In the illustrated embodiment, the recorder 35 comprises a magnetic apparatus suitable for recording a digital representation of the incoming signal, as provided by the synchronous counter. This recorder may comprise a rotating drum having a magnetic recording tape affixed thereto in known manner and preferably includes parallel magnetic strips or channels suitable for concurrent recordation of desired information. Thus, one or more magnetic channels may be employed to record a digital value and additional channels may be used to record the amplitude range established by the level control circuit. By way of example, if three different level control ranges are provided having a gain ratio of 1–10–100, the counter ranges may be correlated therewith by providing a first scale providing digital value from 0–9 and two additional scales for multiplying this range by 10 and 100, respectively. The counter may then be coupled to a recorder wherein a first counter scale of 0–9 may be recorded and wherein two additional recording channels are provided for recording the two additional counter ranges for multiplying the value of the first scale by 10 and 100, respectively.

One or more additional recording channels may be provided for information, such as the polarity of the signal recorded and a reference time base signal, if desired.

In accordance with a further embodiment, the recorder 35 may comprise a photographic apparatus for photographing a visible indication presented by the counter 30 which, in turn, may conveniently comprise a decade counter presenting continuously varying indications throughout its range which, for example, may extend from 0–10, 0–100, or 0–1000, as the case may be.

The comparison circuit comprises two (2) pairs of electron discharge devices 50, 51 and 60, 61 which may be of the triode type, as shown, and which may further conveniently comprise a pair of dual-triode devices such as the commercially available type 6SN7. For convenience of explanation, these devices are hereinafter referred to as the upper and lower signal amplifiers 50, 51 and the upper and lower reference amplifiers 60, 61 as shown in the drawing. Each of the four (4) devices comprises an anode, a cathode and a control electrode or grid. The respective cathodes of all four (4) devices are connected to ground in known manner. The respective anodes are connected through appropriate load-impedances comprising resistance elements to the positive or B+ side of a source of operating potential (not shown). The negative side of the source is grounded in conventional manner in order to complete the usual circuit paths. The incoming signal wave, to be compared with the varying reference potential, is applied in phase-opposition to the respective control electrodes of the two (2) signal amplifiers 50, 51. In the present embodiment, this is accomplished by means of the phase-splitting transformer $T_2$, having its two end terminals individually connected to the control grid of one of the upper and lower signal amplifier devices respectively. The center tap of the secondary winding of transformer $T_2$ is connected to ground. Thus, the incoming signal wave is applied to the two (2) signal amplifier devices 50, 51 in opposite phase. The time-varying reference potential is applied by means of a suitable connection from the varying reference source to the respective control grid of both the upper and lower reference amplifiers 60, 61. In the illustrated embodiment, the two reference grids are connected to the rotor 22 of a selector switch mechanism that is adapted and arranged to sweep through a desired range of potentials, as discussed above.

A uni-directional conducting device or diode 70 is coupled in series with a comparison resistance element 71 between the respective anodes of the upper signal amplifier and upper reference amplifier and a similar series circuit comprising a diode 80 and a comparison resistance element 81 is coupled between the respective anodes of the two lower devices. The uni-directional devices 70, 80 may comprise conventional diodes and are preferably of the dry rectifier type such as the well-known selenium, copper-oxide, germanium or silicon devices; however, vacuum tubes may also be employed, if desired. The polarity of the rectifiers in both the upper and lower portions of the circuit is such that current may pass only from the anode of the respective reference amplifier to the anode of the appropriate signal amplifier. The comparison circuit output is derived across the respective upper and lower comparison resistance elements, connected between the appropriate signal amplifier anode and rectifier, and is coupled through appropriate decoupling capacitors to the utilization circuit, shown as a recorder.

In operation, the upper and lower signal amplifiers are biased in known manner so that only the positive portions of the incoming signal wave, as applied to the phase splitting transformer, are passed by the upper one and only the negative portions of the incoming signal wave are passed by the lower one. However, it is noted that the negative portion of the original signal wave, as applied to the phase splitter, is of positive polarity as applied to the lower signal amplifier, due to the phase inversion of the signal by the phase splitting transformer. The output of each of the signal amplifier devices is compared with the output of the respective reference amplifier device, the latter being representative of cyclic variations of the reference source throughout its range, by means of the series circuit comprising the appropriate uni-directional device and comparison resistance coupled between the respective anodes of the devices. When the potentials applied to the grids of the respective signal and reference amplifiers are the same, their anodes are at the same potential and no voltage drop is produced across the comparison resistance, but when the potential of the reference anode exceeds that of its respective signal anode, a voltage appears across the comparison resistance connected therebetween. When the potential on the signal amplifier anode is more positive than the reference circuit anode no voltage drop occurs due to the polarity of the appropriate uni-directional device. Thus, a voltage drop across the appropriate comparison resistance, when such exists, represents an excess in positive potential of the reference anode over the signal anode and thus, indicates that the reference potential is more negative than the signal wave. However, when the two anodes are at the same potential, or when the signal wave is more negative than the reference wave, no difference in potential appears across the appropriate comparison resistance. In order that the comparison circuit operate advantageously, the time interval during which the source of reference potential scans through the entire range represents on the order of one-half cycle or less of a signal wave to be sampled and preferably considerably less than one-half cycle, if high order of definition and accuracy is to be obtained. Thus, during each half cycle of the signal wave the reference source will scan the signal wave at least once and preferably many times, and each time that the reference signal coincides with the value of the signal wave, the change in potential across one of the comparison resistances affords means for actuating the recorder in order to record the instantaneous value of the signal presented by the counter during the instant when the values the signal and reference waves coincide.

The preferred mode of operation contemplates sampling the incoming signal at a comparatively fast rate and actuating the recorder at the instant that the reference wave becomes as positive as the signal at the point of coincidence therewith. Thus, the recorder is actuated at the instant that the potential across the comparison resistance (either upper or lower) goes to zero from a previous value. Means are provided for triggering the recorder only once during each cycle of the reference source so that only the coincidence will be recorded. The polarity of the signal at coincidence may be separately indicated by determining whether the upper or lower signal amplifier is conducting at the time of coincidence. In the illustrated embodiment, the signal polarity is accounted for by coupling the output of the upper and lower signal amplifier, respectively, to the recorder in known-manner, which may include the usual decoupling capacitors, as illustrated. While two separate paths are shown, one from each of the signal amplifiers to the recorder, it is possible to omit one of these paths, based upon the principle that is only necessary to indicate which one of the two devices is conducting, inasmuch as the comparison signal must be due to one or the other of the two devices but not to both. The informaton as to the polarity of the signal at coincidence may be recorded on a separate channel or channels on a magnetic recorder when such is employed.

Referring now to Figure 2, there is shown a specific embodiment of the automatic level control portion of the system and a specific control bias circuit associated therewith. In this embodiment, the signal gain level and counter control bias are both determined as functions of a single switching circuit, thereby assuring accurate synchronism therebetween.

The components of Figure 2, correspond to the correspondingly-numbered components of Figure 1. The secondary winding 15 of $T_1$ is coupled to an appropriate amplifier 40 which, in turn, is coupled in known manner to a suitable rectifier circuit 41 which may further include a filter 42 for smoothing the rectified signal wave, thereby to provide a uni-directional current corresponding to the average amplitude of the detected geophone signal wave. The output of the filter 42 is coupled directly across the control winding of a first switching relay $R_1$ and, in series with a suitable resistance 43 across the control winding of a second relay $R_2$. The purpose of the rsistance 43 is to afford means for applying different amounts of the rectified signal wave to the two relay windings $R_1$ and $R_2$, whereby the two relays will be actuated in response to different signal amplitudes. This difference is preferably made adjustable by making the resistance a variable one, as shown. By this arrangement, identical components may be selected for both relay windings $R_1$ and $R_2$ and different operating points determined by the resistance element 43 connected in series with $R_2$. Alternatively, though lacking certain advantages of the aforementioned arrangement, the resistance 43 may be eliminated by the use of relay winding having different current requirements for operation. The switching contacts actuated by means of windings $R_1$ and $R_2$ provide means for switching the energy level of the level control circuit in the manner symbolized by gates $G_1$, $G_2$, and $G_3$ of Figure 1. More particularly, relay $R_1$ includes first and second fixed contacts, the first of which is connected to the upper portion of the voltage divider at point A and the second of which is connected to the input of amplifier 21. Relay $R_1$ further comprises first and second movable contacts, the first of which is normally closed in contact with the first fixed contact and the second of which is normally open, but adapted and arranged to make contact with the second fixed contact open actuation of the relay. Similarly, the second relay $R_2$ includes first and second fixed contacts and first and second movable contacts. The first and second fixed contacts of relay $R_2$ are connected to points B and C, respectively, on the voltage divider. The first movable contact of the second relay $R_2$ is connected directly to the amplifier 21, together with the aforementioned contacts of relay 1. In the normal inoperative position, the first movable contact is open. Both of the relays $R_1$ and $R_2$ are adapted and arranged upon actuation, to cause their respective first set of contacts to open and second set to close.

Considering now the operation of the circuit of Figure 2, and assuming a signal of relatively low average amplitude, the initial condition for this circuit is such that the full signal appearing at point A on the voltage divider is coupled through the normally closed terminals of the first relay $R_1$ to the amplifier 21. As the signal level increases to a predetermined value sufficient to operate the first relay $R_1$, but insufficient to operate the second relay $R_2$, the first relay $R_1$ operates to a hold position. In the operation or hold position, the first set of contacts open and the second contacts close, thus, interrupting the signal path from point A on the voltage divider and completing a path from point B through the first contact, pair 4 of the second relay $R_2$, thence, through the second contact pair of the first relay $R_1$ to the amplifier 21. Upon further increase of the average signal amplitude to a higher predetermined value, the second relay $R_2$ operates, thus opening its first set of contacts and closing its second contacts, thereby interrupting the path from point B and completing a different path from point C on the voltage divider to the input of amplifier 21. Thus, it is seen that the average signal amplitude controls the gain level of the system.

In accordance with one embodiment, the rectified average amplitude provided by the bias circuit may be employed to establish the range of the counter in conformity with the gain characteristic of the system.

In accordance with another embodiment, as illustrated in Figure 2, an additional set of relay contacts on relays $R_1$ and $R_2$ may be employed for this purpose. In accordance with one manner applying this technique, bias levels high, low and medium, corresponding to gain level ranges high, low and medium, may be attained by means of a direct-current source of potential such as a battery or the equivalent connected across a voltage divider similar to that employed for controlling the gain of the system, together with means for switching the appropriate potential level simultaneously with the gain control switching. An additional set of contacts on the gain control switching relays afford a convenient and novel means for accomplishing this result.

Referring now to Figure 3, there is shown a graphic display of the switching characteristics of the circuit shown in Figure 2. A better understanding of this graph may be had by referring to Figure 4 which is believed to be self-explanatory, together with the table.

While certain specific embodiments have been shown and described, it will, of course, be understood that various modifications may be made without departing from the principles of the invention. The appended claims are therefore intended to cover any such modifications within the true spirit and scope of the invention.

I claim:

1. A seismic signal recording system comprising a geophone, circuit means connected to said geophone for amplifying and translating the output signals from said geophone, said circuit means including means for attenuating said signals a plurality of constant percentage amounts, gating means connected to said attenuating means for selecting a predetermined one of said percentage amounts, means responsive to the amplitude of said output signals for actuating said gating means to maintain the attenuated signals within a predetermined relatively small range of amplitude levels, means for converting said attenuated signals to corresponding digital values, and means for recording said digital values including means for indicating the percentage amount of attenuation existing at any time so that the digital values may be converted to the original amplitudes.

2. A seismic signal recording system according to claim 1 wherein said converting means converts to corresponding digital values on a logarithmic scale.

3. In a seismic signal recording system in combination a geophone, and circuit means connected to said geophone for amplifying and translating the output signals from said geophone, the improvement comprising a voltage divider for attenuating said signals and having a plurality of taps thereon, gating means connected to said taps for selecting a predetermined level of said signals, and means responsive to the average amplitude of said output signals for automatically actuating said gating means at predetermined amplitudes thereof, in order to maintain the level of said signals after attenuation relatively constant.

4. In a seismic signal recording system in combination a geophone, and circuit means connected to said geophone for amplifying and translating the output signals from said geophone, the improvement comprising a voltage divider for attenuating said signals and having a plurality of taps thereon, a plurality of relays having contacts connected to said taps, second circuit means for connecting said relay contacts with one input connection of an amplifier for said attenuated signals, the other input connection being connected directly to a common end of said voltage divider, and means for actuating said relays in response to the average amplitude of said signals whereby the attenuated amplitude of the signals remains at a relatively constant level.

References Cited in the file of this patent

UNITED STATES PATENTS

| | | |
|---|---|---|
| 2,279,232 | Graham | Apr. 7, 1942 |
| 2,367,049 | Petty | Jan. 9, 1945 |
| 2,395,481 | Hoover | Feb. 26, 1946 |
| 2,400,190 | Clark | May 14, 1946 |
| 2,639,209 | Gamarekian | May 19, 1953 |
| 2,666,175 | Seeger | Jan. 12, 1954 |
| 2,717,994 | Dickinson et al. | Sept. 13, 1955 |
| 2,724,086 | Lindberg | Nov. 15, 1955 |
| 2,736,889 | Kaiser | Feb. 28, 1956 |
| 2,761,968 | Kuder | Sept. 4, 1956 |